United States Patent
Chou et al.

(10) Patent No.: US 7,034,467 B1
(45) Date of Patent: Apr. 25, 2006

(54) CONTROLLER FOR SUPPRESSING TEMPERATURE OF SCREEN

(75) Inventors: Chin-Wen Chou, Taipei Hsien (TW); Ying-Nan Cheng, Taipei Hsien (TW); Chin-Biau Chung, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 0 days.

(21) Appl. No.: 10/954,519

(22) Filed: Oct. 1, 2004

(51) Int. Cl.
*H01J 13/32* (2006.01)
(52) U.S. Cl. ............................ 315/112; 315/116; 315/117
(58) Field of Classification Search ................ 315/112, 315/116, 117
See application file for complete search history.

(56) References Cited

U.S. PATENT DOCUMENTS 5,406,172 A * 4/1995 Bennett ................... 315/112
6,188,177 B1  2/2001 Langer et al.

FOREIGN PATENT DOCUMENTS

| JP | 9-102397 A | 4/1997 |
|---|---|---|
| JP | 2000-150191 A | 5/2000 |
| JP | 2000-243586 A | 9/2000 |
| JP | 2000-292775 A | 10/2000 |
| JP | 2000-340388 A | 12/2000 |
| JP | 2004-39336 A | 2/2004 |
| JP | 2004-69907 A | 3/2004 |
| JP | 2004-220810 A | 8/2004 |
| TW | 383122 A | 2/2000 |

* cited by examiner

*Primary Examiner*—Trinh Vo Dinh
(74) *Attorney, Agent, or Firm*—Birch, Stewart, Kolasch & Birch, LLP

(57) ABSTRACT

The present invention discloses a controller for suppressing the temperature of a screen in order to maintain the ambient temperature of the screen to the level of a predetermined standard temperature as to avoid the screen from being operated at abnormal temperature and lowering its service life. The present invention utilizes a temperature detector unit connected to a control unit for detecting the ambient temperature and outputting a temperature signal to the control unit. The temperature signal is compared with the predetermined standard temperature to determine the magnitude of a cold cathode fluorescent lamp for suppressing the operation of the screen to the best ambient temperature and maintaining the normal service temperature.

4 Claims, 3 Drawing Sheets

CONTROLLER FOR SUPPRESSING TEMPERATURE OF SCREEN

FIELD OF THE INVENTION

The present invention relates to a controller for suppressing the temperature of a screen, more particularly to a controller for maintaining a screen to be operated at a normal ambient temperature.

BACKGROUND OF THE INVENTION

At present, an LCD screen of desktop and notebook computers, personal digital assistants (PDAs) and webpads utilizes a driver device to drive a high-voltage driven cold cathode fluorescent lamp (CCFL) and project a light on a backlit panel, so that users can view the display on screen clearly. Further, some of the present CCFL driver device manufacturers are solving the problems on how to equalize and stabilize the brightness of the CCFL.

Some of the circuit designs related to the way of equalizing the brightness of the CCFL were disclosed in the R.O.C. Patent Publication No. 383122; the Japan Patent Publication Nos. 09-102397, 2000-150191, 2000-292775, 2004-69907, 2004-39336, 2000-243586, 2000-340388 and 2004-220810; and the U.S. Pat. No. 6,188,177. The common technical characteristic of these patents resides on providing a temperature compensation device, which is used to detect the temperature of the illuminant region of the CCFL and then output a temperature signal to a control unit, such that the control unit outputs different drive signals corresponding to the impedance at different temperatures of every cold cathode fluorescent lamp to maintain the luminosity of each CCFL. In other words, the aforementioned patents focus on changing the magnitude of the drive signal by the ambient temperature as to equalize the brightness of the CCFL. However, a very difficult problem exists in the screen industry that the CCFL luminous area is a closed space and the heat produced cannot be dispersed effectively by the existing technology as to equalize the brightness of the CCFL, and it usually requires a higher drive voltage and current to overcome the problem, but on the other hand, the heat produced is increased (for example, the brightness should be adjusted for outdoors). Besides this, if the screen is placed at a position with a high ambient temperature such as the living room illuminated by sunlight will give rise to an overloading ambient temperature to the overall screen, and thus affecting the service life of all electronic components and the liquid crystal display panel. As a result, the CCFL will be damaged easily, and the resin equalizer will be deteriorated to produce the yellow phenomenon due to the high temperature. Since the CCFL and equalizer are important components of a screen and it is difficult to replace the components once they are damaged, therefore most consumers are forced to replace the whole set of screen, which does not comply with the service life and economic benefits of the existing screens.

SUMMARY OF THE INVENTION

The primary objective of the present invention is to overcome the foregoing shortcoming and avoid the exiting deficiency by providing a controller for suppressing the temperature for the operation of a screen to a predetermined standard temperature. Unlike the foregoing patents, the invention provides a protective mechanism in addition of maintaining the equalized brightness of the CCFL under normal temperature, wherein a temperature detector unit connected to the control unit for detecting the ambient temperature and outputting a temperature signal to the control unit. The temperature signal and the predetermined standard temperature are compared to determine the magnitude of the drive power of the CCFL; if the temperature is higher than the predetermined standard temperature, then the drive power is reduced to achieve the purposes of lowering the temperature and suppressing the screen to operate at the best ambient temperature and maintaining the normal service life of the controller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

To make it easier for our examiner to understand the objective of the invention, its structure, innovative features, and performance, we use a preferred embodiment and the attached drawings for the detailed description of the invention.

Figure 1:
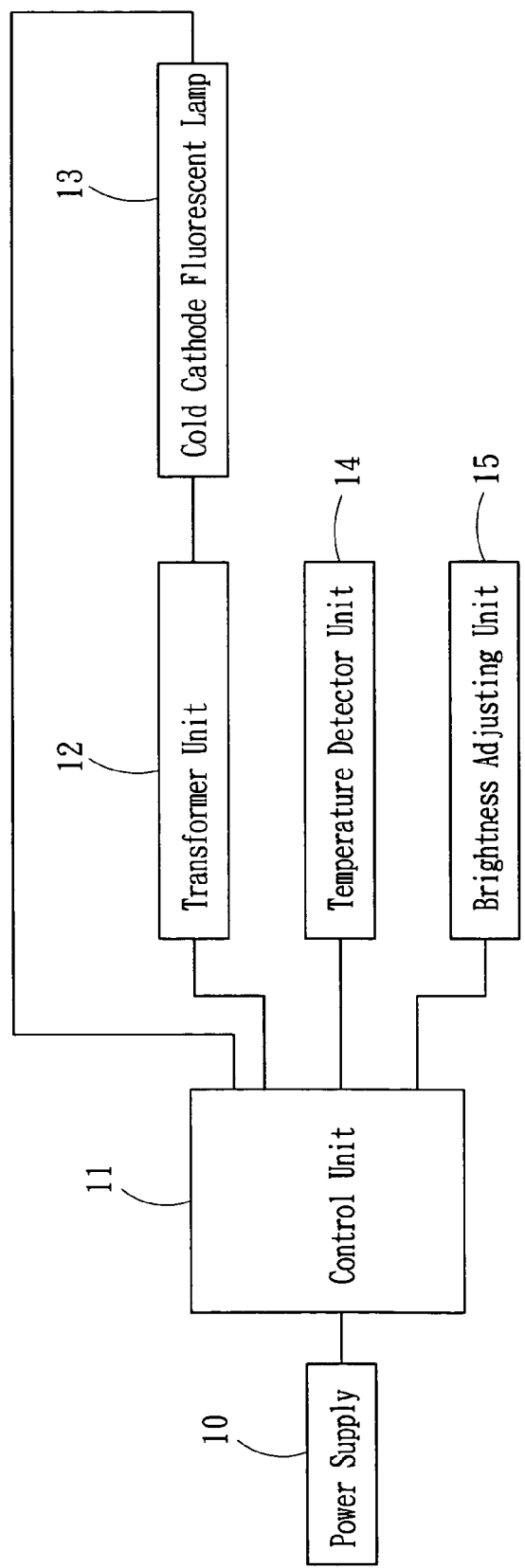
FIG. 1 is a circuit block diagram of the present invention.

Please refer to FIG. 1 for the circuit block diagram of the present invention. In FIG. 1, the screen according to the present invention comprises a power supply 10 connected with an output power signal, and the power supply 10 refers to the device converting the alternate current into a direct current and outputting the direct current as a direct current power signal or a pulse direct current power signal. The power signal outputted from the power supply 10 is outputted to a control unit 11, and the control unit 11 according to the present existing technology comprises a pulse width modulator (PWM) and a MOS power transistor or a waveform generator and a signal amplifier. The control unit 11 is used for outputting a drive signal and a standard temperature is used to output a drive signal, and a predetermined standard temperature is set for the control unit 11. A temperature detector unit 14 is connected to the control unit 11 for detecting an ambient temperature and outputting a temperature signal to the control unit 11. The temperature detector unit 14 could a thermistor, a positive temperature coefficient (PTC) thermistor or a negative temperature coefficient (NTC) thermistor. Further, the control unit 11 further connects to a brightness adjusting unit 15, and the brightness adjusting unit 15 outputs a light adjust signal to the control unit 11. The foregoing drive signal is outputted to a transformer unit 12, and the transformer unit could be a coiled transformer or a piezoelectric transformer. If a waveform correction inductor is installed at the front end of the piezoelectric transformer, the transformer unit 12 receives the drive signal and converts the power signal to output a drive signal to drive the power CCFL 13, wherein the CCFL 13 feeds back a tube current signal and a drive power signal to the control unit 11.

Figure 2:
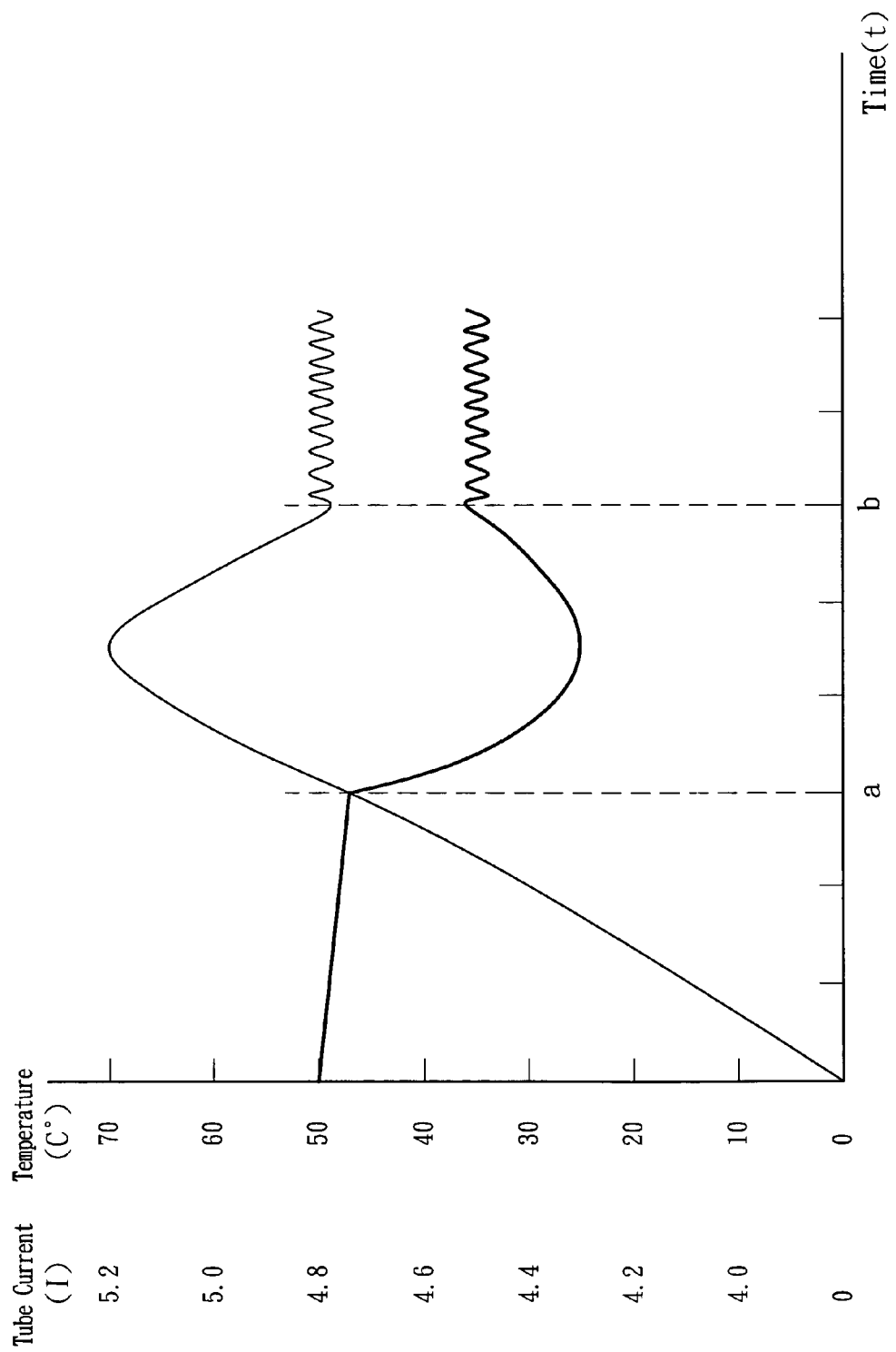
FIG. 2 is a graph showing the relation between the temperature of the operation and the current of the cold cathode fluorescent lamp according to the present invention.

Please refer to FIG. 2 for the graph showing the relation between the temperature of the operation and the current of the cold cathode fluorescent lamp 13 according to the present invention. To make it easier for our examiner to understand the technical characteristic of the invention, two implementation modes are illustrated in FIG. 2. The figure mainly shows that the screen operates at normal temperature. If a user select different brightness for displaying the screen due to the different angle of incidence, the brightness adjusting unit 15 will output a light adjust signal to the control unit 11 according to the brightness selected by the user, and the control unit 11 will output a drive signal to a transformer unit 12 according to the light adjust signal to convert and increase the power and output the drive power to the CCFL 13, and the CCFL 13 will feed back a tube current signal to the control unit 11. Assumed that the current is 4.8 mA, the CCFL 13 will be lit, and heat energy will be generated when the transformer unit 12 operates and the CCFL 13 lights up. Therefore, the ambient temperature of the screen increases gradually, and the temperature detector unit 14 will detect the temperature signal and send it to the control unit 11. Assumed that the predetermined standard temperature is 50° C., the tube current is maintained at the level of 4.8 mA, if the temperature signal received by the control unit 11 has not reached 50° C. In the figure, it is obvious that there is a slight fluctuation of the tube current. Under normal conditions and the temperature of the CCFL 13 is changing, the impedance is directly proportional to the temperature, but the tube current is inversely proportional to the temperature. As to the properties of the material for the CCFL 13, there is no significant contract of brightness at the temperature below 50° C., therefore there is a fluctuation of tube current. Such fluctuation of the tube current is mainly used for adjusting the luminosity of the CCFL 13, such that the service life of the screen will not be affected when the screen is operated at an ambient temperature lower than the predetermined standard temperature. Therefore, the control unit 11 changes the magnitude of the drive signal according to the change of temperature, such that the CCFL 13 can maintain an equalized brightness under normal temperature. If the angle of incidence of sunlight is changed or the screen is operated abnormally, the ambient temperature will reach the critical point a of 50° C. To avoid the screen from being operated at a high-temperature environment and the service life of electronic components from being affected, the control unit 11 will lower the tube current immediately. When the tube current is lowered, the luminosity of the CCFL 13 will also drop. The invention also uses the critical point a of the luminosity efficiency of the CCFL 13 is 50° C., and the critical point could be up to 70° C. according to the current existing technology, which exceeds the critical point a of the temperature (the luminosity efficiency will not be increased, but decreased instead). Since the screen continues operating, therefore the temperature will not drop immediately. From the figure, the curve still goes up when the ambient temperature of the tube current at critical point a drops. After the tube current has been lowered for a period of time, The ambient temperature will be dropped to an equilibrium point b, and such equilibrium point b means that the ambient temperature and the tube current are maintained at the level of the predetermined standard temperature. Of course, if the ambient temperature is lower than the predetermined standard temperature, then the control unit 11 will equalize the luminosity again and the fluctuation at the section after the equilibrium point b will occur to keep the CCFL 13 at a certain level of luminosity.

Figure 3:
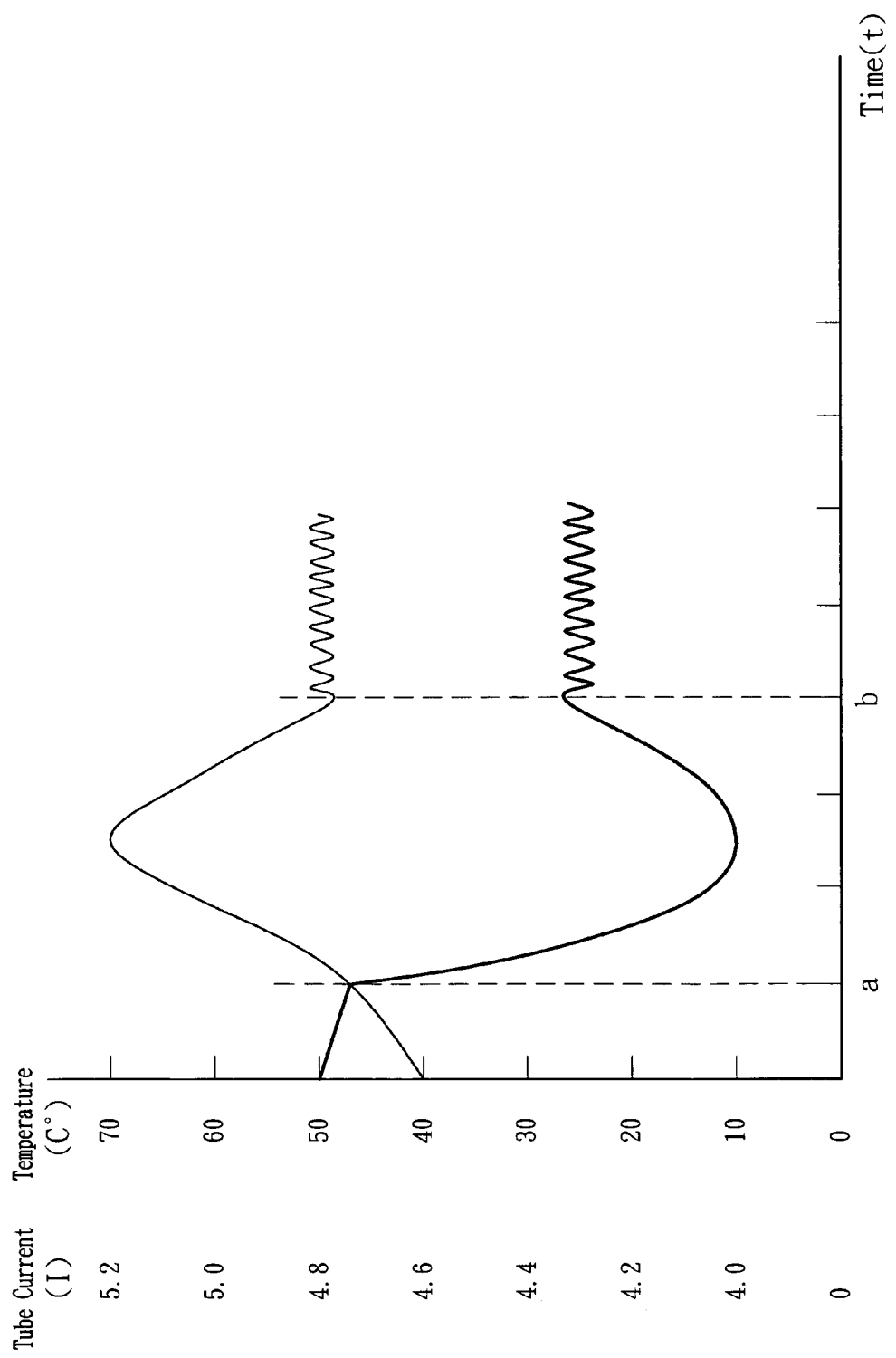
FIG. 3 is a graph showing the relation between the temperature of the screen operated at a high-temperature region and the current of the cold cathode fluorescent lamp according to the present invention.

Compared with FIG. 2, FIG. 3 shows the graph of the relation between the temperature of the screen operated at a high-temperature region and the current of the cold cathode fluorescent lamp according to the present invention. Since the ambient temperature is higher, particularly in the region with sunlight, the critical point a of the temperature will be reached easily after the screen has been operated for a short period of time. Then, the control unit 11 will drop the drive signal immediately to avoid the screen from operating at a exceedingly high temperature. The extent of the drop is larger than that as shown in FIG. 2, and other technical characteristics are the same as those described above.

From the description above, the present invention uses the temperature signal as the main parameter of the magnitude of the drive signal, such that the screen can operate at a temperature equal to or lower than the standard temperature, and the service life of the equalizer, CCFL 13, transformer unit 12 or other electronic components will not be shortened due to the overheat. Within the allowable range of ambient temperature, the equalized luminosity of the screen can still be maintained. The present invention also can achieve the double effects of using temperature to adjust the luminosity of the CCFL 13 and preventing the screen from being overheated.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A controller for suppressing temperature of a screen, comprising:

a power supply, for outputting a power signal;

a control unit, for receiving said power signal and outputting a drive signal, and a predetermined standard temperature, and a temperature unit coupled to said control unit for detecting an ambient temperature and outputting a temperature signal to said control unit;

a transformer unit, for receiving a drive signal and converting said power signal to output a drive power to drive a cold cathode fluorescent lamp;

whereby said predetermined standard temperature and said temperature signal are compared to determine the magnitude of said drive power of said cold cathode fluorescent lamp as to maintain said ambient temperature not higher than said predetermined standard temperature.

2. The controller for suppressing temperature of screen of claim 1, wherein said cold cathode fluorescent lamp feeds back a tube current signal to said control unit.

3. The controller for suppressing temperature of screen of claim 1, wherein said control unit further couples to a brightness adjusting unit that outputs a light adjust signal to said control unit.

4. The controller for suppressing temperature of screen of claim 1, wherein said drive signal bases on said temperature signal as a main parameter and said light adjust signal as a secondary parameter.

* * * * *